United States Patent
Ahn et al.

(10) Patent No.: US 9,413,514 B2
(45) Date of Patent: Aug. 9, 2016

(54) OPERATING METHOD IN MULTIPLE CELLS, AND WIRELESS DEVICE USING SAME

(75) Inventors: Joon Kui Ahn, Anyang-si (KR); Suck Chel Yang, Anyang-si (KR); Min Gyu Kim, Anyang-si (KR); Dong Youn Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 124 days.

(21) Appl. No.: 14/232,578

(22) PCT Filed: Aug. 9, 2012

(86) PCT No.: PCT/KR2012/006355
§ 371 (c)(1),
(2), (4) Date: Jan. 13, 2014

(87) PCT Pub. No.: WO2013/022295
PCT Pub. Date: Feb. 14, 2013

(65) Prior Publication Data
US 2014/0126529 A1  May 8, 2014

Related U.S. Application Data

(60) Provisional application No. 61/521,381, filed on Aug. 9, 2011, provisional application No. 61/521,724, filed on Aug. 9, 2011, provisional application No. 61/546,535, filed on Oct. 12, 2011, provisional application No. 61/591,972, filed on Jan. 29, 2012.

(51) Int. Cl.
*H04W 4/00* (2009.01)
*H04J 3/16* (2006.01)
*H04L 5/00* (2006.01)
*H04W 72/04* (2009.01)
*H04W 52/24* (2009.01)

(52) U.S. Cl.
CPC .......... *H04L 5/0073* (2013.01); *H04W 52/242* (2013.01); *H04W 52/243* (2013.01); *H04W 72/0406* (2013.01)

(58) Field of Classification Search
CPC ..... H04W 51/14; H04W 72/04; H04W 52/24; H04W 52/243; H04W 52/242; H04W 71/14; H04W 24/00; H04W 72/0406; H04W 52/146; H04W 52/365; H04L 5/00; H04L 5/0073; H04L 27/26
USPC ......... 370/329–335, 203–210, 337–338, 468, 370/395.21, 252–255, 318, 319, 320; 455/522, 63.1, 450, 501, 13.4, 515
See application file for complete search history.

(56) References Cited

U.S. PATENT DOCUMENTS 8,351,974 B2 *  1/2013  Ahn et al. ............... 455/522
8,792,924 B2 *  7/2014  Xiao et al. .............. 455/515

(Continued)

FOREIGN PATENT DOCUMENTS

| KR | 10-2010-0070976 A | 6/2010 |
|---|---|---|
| WO | WO 2010/095913 A2 | 8/2010 |
| WO | WO 2011/019653 A1 | 2/2011 |

*Primary Examiner* — Hanh N Nguyen
(74) *Attorney, Agent, or Firm* — Birch, Stewart, Kolasch & Birch, LLP

(57) ABSTRACT

Provided is an operating method in multiple cells, and a wireless device using same. The wireless device monitors a control channel in each subframe of a normal cell. The wireless device receives information regarding the transmission power of a physical signal of an expanded cell having an unmonitored control channel, and receives the physical signal in the expanded cell.

9 Claims, 7 Drawing Sheets

(56) References Cited

U.S. PATENT DOCUMENTS

| | | | |
|---|---|---|---|
| 8,818,443 B2* | 8/2014 | Yamamoto et al. | 455/522 |
| 8,917,605 B2* | 12/2014 | Pelletier | H04W 52/365 |
| | | | 370/236 |
| 2010/0297993 A1 | 11/2010 | Heo et al. | |
| 2011/0158118 A1* | 6/2011 | Chou | H04L 27/2601 |
| | | | 370/252 |
| 2012/0044821 A1 | 2/2012 | Kim et al. | |

\* cited by examiner

OPERATING METHOD IN MULTIPLE CELLS, AND WIRELESS DEVICE USING SAME

CROSS REFERENCE TO RELATED APPLICATIONS

This non-provisional application is a National Stage entry under U.S.C. §371 of International Application No. PCT/KR2012/006355 filed on Aug. 9, 2012, which claims the benefit of U.S. Provisional Application Nos. 61/521,381 filed on Aug. 9, 2011, 61/521,724 filed on Aug. 9, 2011, 61/546,535 filed on Oct. 12, 2011 and 61/591,972 filed on Jan. 29, 2012. The entire contents of all of the above applications are hereby incorporated by reference.

TECHNICAL FIELD

The present invention concerns wireless communications, and more specifically, to a method of operating in a multi-cell and a wireless device using the same.

BACKGROUND ART

3GPP ($3^{rd}$ Generation Partnership Project) TS (Technical Specification) release 8-based LTE (Long Term Evolution) is a leading next-generation mobile communication standard. Recently, LTA-A (LTE-advanced) which is based on 3GPP TS release 10 supportive of multi-carrier is being 3GPP LTE-A and its subsequent standards support a multi-carrier and this technology is referred to as carrier aggregation. One carrier corresponds to one cell, and resultantly, a terminal in a multi-carrier system may receive services from a plurality of serving cells.

In each serving cell, a sync signal and control channels for normal communication are generally transmitted. However, an introduction of a new type of cell is being considered in order to mitigate inter-cell interference and increase carrier extendibility.

DISCLOSURE OF THE INVENTION

The present invention provides a method of operating in a multi-cell and a wireless device using the same.

In an aspect, there is a provided a method of operating a wireless device in a multi-cell. The method may comprise: monitoring a control channel in each sub-frame of a normal cell; receiving information on a transmission power of a physical signal of an extension cell on which the control channel is not monitored; and receiving the physical signal in the extension cell based on the transmission power.

The physical signal may include at least one of a reference signal and a sync signal.

The information on the transmission power may be received through the normal cell.

In an extension cell, errors caused by path-loss estimation or channel estimation and inter-cell interference occurring due to uplink transmission may be reduced.

MODES FOR CARRYING OUT THE PREFERRED EMBODIMENTS

The wireless device may be fixed or have mobility, and the UE (User Equipment) may also be referred to by other terms such as an MS (Mobile Station), an MT (Mobile Terminal), a UT (User Terminal), an SS (Subscriber Station), a wireless device, a PDA (Personal Digital Assistant), a wireless modem, or a handheld device. Or, the wireless device may be a device that supports data communication only, such as an MTC (Machine-Type Communication) device.

The base station (BS) generally refers to a fixed station that communicates with a wireless device, and may be referred to by other terms such as an eNB (evolved-NodeB), a BTS (Base Transceiver System), or an access point.

Hereinafter, applications of the present invention based on 3GPP LTE (Long Term Evolution) that is based on 3GPP ($3^{rd}$ Generation Partnership Project) TS (Technical Specification) release 8 or 3GPP LTE-A that is based on 3GPP TS release 10 are described. These are merely examples and the present invention may apply to various communication networks.

A wireless device may be served by a plurality of serving cells. Each serving cell may be defined with a DL (downlink) CC (component carrier) or a pair of a DL CC and a UL (uplink) CC. The CC may be defined with a center frequency and a bandwidth. When a plurality of DL CCs correspond to the plurality of serving cells, respectively, the plurality of DL CCs may be adjacent to each other or not.

The serving cells may be classified into primary cells and secondary cells. The primary cell operates at a primary frequency, and is a cell that is designated as the primary cell when an initial connection establishment process or connection reestablishment process is initiated or a handover process is performed. The primary cell is also referred to as reference cell. The secondary cell operates at a secondary frequency, may be configured after an RRC (Radio Resource Control) connection is established, and may be used to provide an additional radio resource. At least one primary cell is always configured, and secondary cells may be added/modified/released by upper layer signaling (e.g., RRC (Radio Resource Control) message).

The CI (cell index) of the primary cell may be fixed. For example, the lowest CI may be designated as the CI of the primary cell. Hereinafter, the CI of the primary cell is 0, and CIs of the secondary cells are assigned with 1 and its subsequent numbers, respectively.

Figure 1:
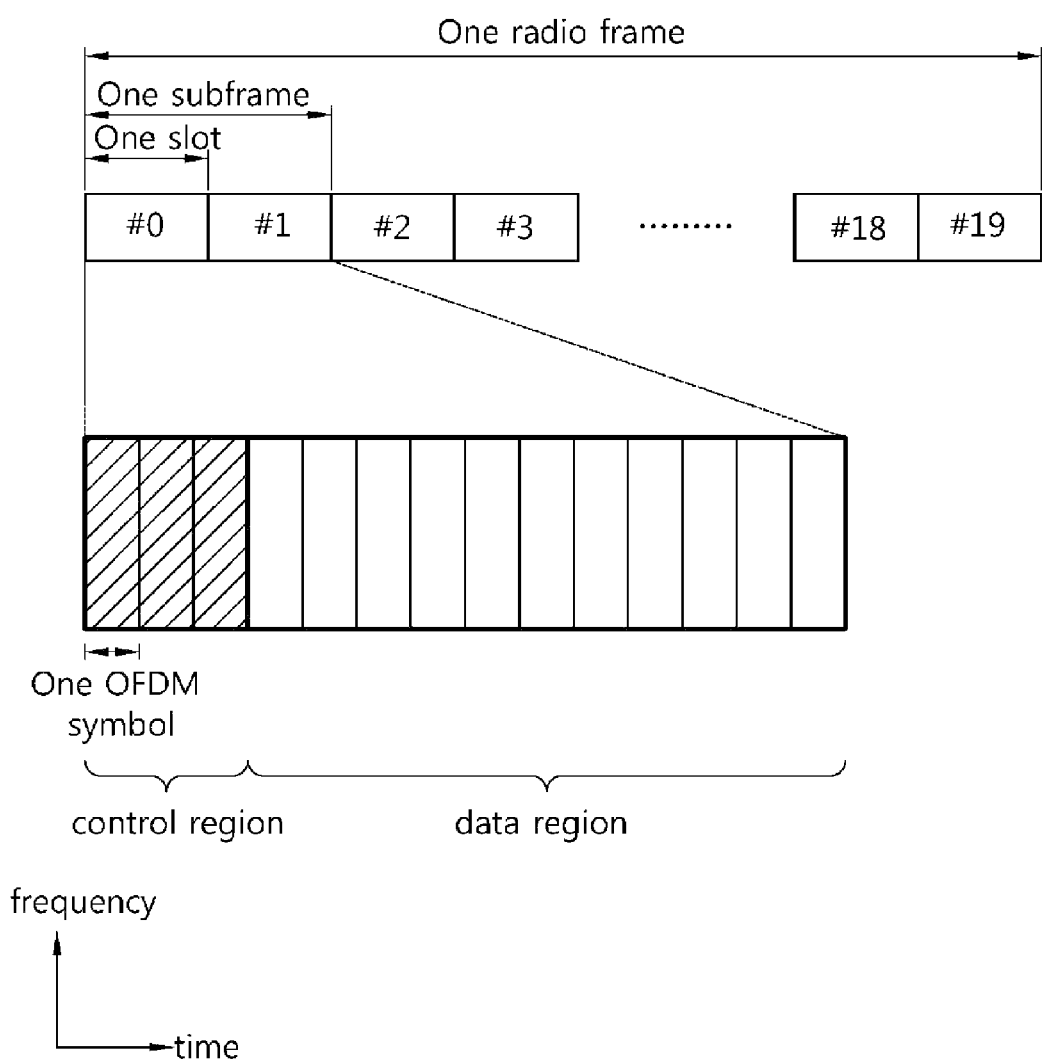
FIG. 1 illustrates the architecture of a downlink radio frame in the 3GPP LTE-A system.

FIG. 1 shows the architecture of a downlink radio frame in 3GPP LTE-A. For this, 3GPP TS 36.211 V10.2.0 (2011-June) "Evolved Universal Terrestrial Radio Access (E-UTRA); Physical Channels and Modulation (Release 10)," Ch. 6 may be referenced.

A radio frame includes 10 sub-frames indexed 0 to 9. One sub-frame includes two consecutive slots. The time taken for one sub-frame to be transmitted is denoted TTI (Transmission Time Interval). For example, the length of one sub-frame may be 1 ms, and the length of one slot may be 0.5 ms.

One slot may include a plurality of OFDM (Orthogonal Frequency Division Multiplexing) symbols. 3GPP LTE adopts OFDMA (Orthogonal Frequency Division Multiple Access) on downlink (DL). Thus, the term "OFDM symbol" is used to merely represent one symbol period in the time domain, and there is no limit to access scheme or name. For example, the OFDM symbol may be referenced by other names such as SC-FDMA (single carrier-frequency division multiple access) symbol or symbol period.

Although the example in which one slot includes seven OFDM symbols is described, the number of OFDM symbols included in one slot may vary depending on the length of CP (Cyclic Prefix). As per 3GPP TS 36.211 V10.2.0, one slot, in a normal CP, includes seven OFDM symbols, and one slot in an extended CP includes six OFDM symbols.

The resource block (RB) is a unit for resource allocation, and includes a plurality of subcarriers in one slot. For example, if one slot includes seven OFDM symbols in the time domain and 12 subcarriers in the frequency domain, one resource block may include 7×12 resource elements (REs).

The DL (downlink) sub-frame is separated into a control region and a data region in the time domain. The control region includes up to first four OFDM symbols in the first slot of the sub-frame. However, the number of OFDM symbols included in the control region may vary. A PDCCH (Physical Downlink Control Channel) and other channels are allocated to the control region, and a PDSCH is allocated to the data region.

The UL sub-frame may be separated into a control region assigned with a PUCCH (Physical Uplink Control Channel) for carrying uplink channel information and a data region assigned with a PUSCH (Physical Uplink Shared Channel) for carrying user data in the frequency domain.

A DL control channel is now described.

As set forth in 3GPP TS 36.211 V10.2.0, the physical channels in 3GPP LTE/LTE-A include a PDCCH (Physical Downlink Control Channel), a PCFICH (Physical Control Format Indicator Channel), and a PHICH (Physical Hybrid-ARQ Indicator Channel). Further, the control signals transmitted in the physical layer include a PSS (Primary Synchronization Signal), SSS(s) (Secondary Synchronization Signal), and a random access preamble.

The PSS is transmitted in the last OFDM symbols of the first slot (first slot of the first sub-frame (sub-frame indexed 0)) and the eleventh slot (first slot of the sixth sub-frame (sub-frame indexed 5)). The PSS is used to obtain OFDM symbol sync or slot sync and is associated with a physical cell ID (identity). The PSC (Primary Synchronization Code) is a sequence used in the PSS, and 3GPP LTE offers three PSCs. According to cell ID, one of the three PSCs is transmitted through the PSS. The same PSC is used in each of the OFDM symbols of the first slot and eleventh slot.

The SSSs include a first SSS and a second SSS. The first and second SSSs are transmitted in an OFDM symbol adjacent to the OFDM symbol where the PSS is transmitted. The SSS is used for obtaining frame sync. The SSS, together with the PSS, is used to obtain a cell ID. The first SSS and second SSS use different SSCs (Secondary Synchronization Codes) from each other. When the first and second SSSs each include 31 sub-carriers, two SSC sequences each having a length of 31 are used in the first and second SSSs, respectively.

The PCFICH, transmitted in the first OFDM symbol of the sub-frame carries a CFI (Control Format Indicator) regarding the number (i.e., size of the control region) of the OFDM symbols used for transmission of the control channels in the sub-frame. The wireless device first receives the CIF through the PCFICH and then monitors the PDCCH.

Unlike the PDCCH, the PCFICH is transmitted through a fixed PCFICH resource of the sub-frame without using blind decoding.

The PHICH carries an ACK (positive-acknowledgement)/NACK (negative-acknowledgement) signal for an uplink HARQ (hybrid automatic repeat request). The ACK/NACK signal for the UL (uplink) data over the PUSCH transmitted by the wireless device is transmitted over the PHICH.

A PBCH (Physical Broadcast Channel) is transmitted in first four OFDM symbols of the second slot in the first sub-frame of the radio frame. The PBCH carries system information necessary for the wireless device to communicate with the base station, and the system information transmitted through the PBCH is referred to as an MIB (master information block). In comparison with this, system information transmitted over a PDSCH indicated by the PDCCH is referred to as an SIB (system information block).

The channel information transmitted through the PDCCH is referred to as downlink channel information (DCI). The DCI may include resource allocation of the PDSCH (this is also referred to as a downlink (DL) grant), resource allocation of the PUSCH (this is also referred to as a uplink (UL) grant), a set of transmission power control commands for the individual UEs in any UE group and/or activation of VoIP (Voice over Internet Protocol).

The 3GPP LTE/LTE-A system uses blind decoding to detect a PDCCH. Blind decoding is a scheme to verify whether a received PDCCH (this is referred to as a candidate PDCCH) is its own control channel or not by demasking a desired identifier to the CRC of the PDCCH and conducting a CRC error check.

The base station, after determining the PDCCH format depending on a DCI to be sent out to the wireless device, adds a CRC (Cyclic Redundancy Check) to the DCI and masks a unique identifier (this is referred to as an RNTI (Radio Network Temporary Identifier) to the CRC depending on the owner or purpose of the PDCCH.

The control region in the sub-frame includes a plurality of CCEs (control channel elements). The CCE is a logical allocation unit that is used for providing the PDCCH with a coding rate according to the state of a radio channel, and the CCE corresponds to a plurality of REGs (resource element groups). The REG includes a plurality of resource elements. According to the relationship between the number of CCEs and the coding rate provided by the CCEs, the format of the PDCCH and the bit count of a possible PDCCH are determined.

One REG includes four REs, and one CCE includes nine REGs. In order to configure one PDCCH, {1, 2, 4, 8} CCEs may be used, and each element of {1, 2, 4, 8} is denoted a CCE aggregation level.

The number of CCEs used for transmission of a PDDCH is determined by the base station depending on channel state. For example, one CCE may be used for transmission of a PDCCH in a wireless device having a good downlink channel state. Eight CCEs may be used for transmission of a PDCCH in a wireless device having a poor downlink channel state.

A control channel consisting of one or more CCEs perform interleaving on a per-REG basis, and after a cell ID (identifier)-based cyclic shift is conducted, is mapped with a physical resource.

Figure 2:
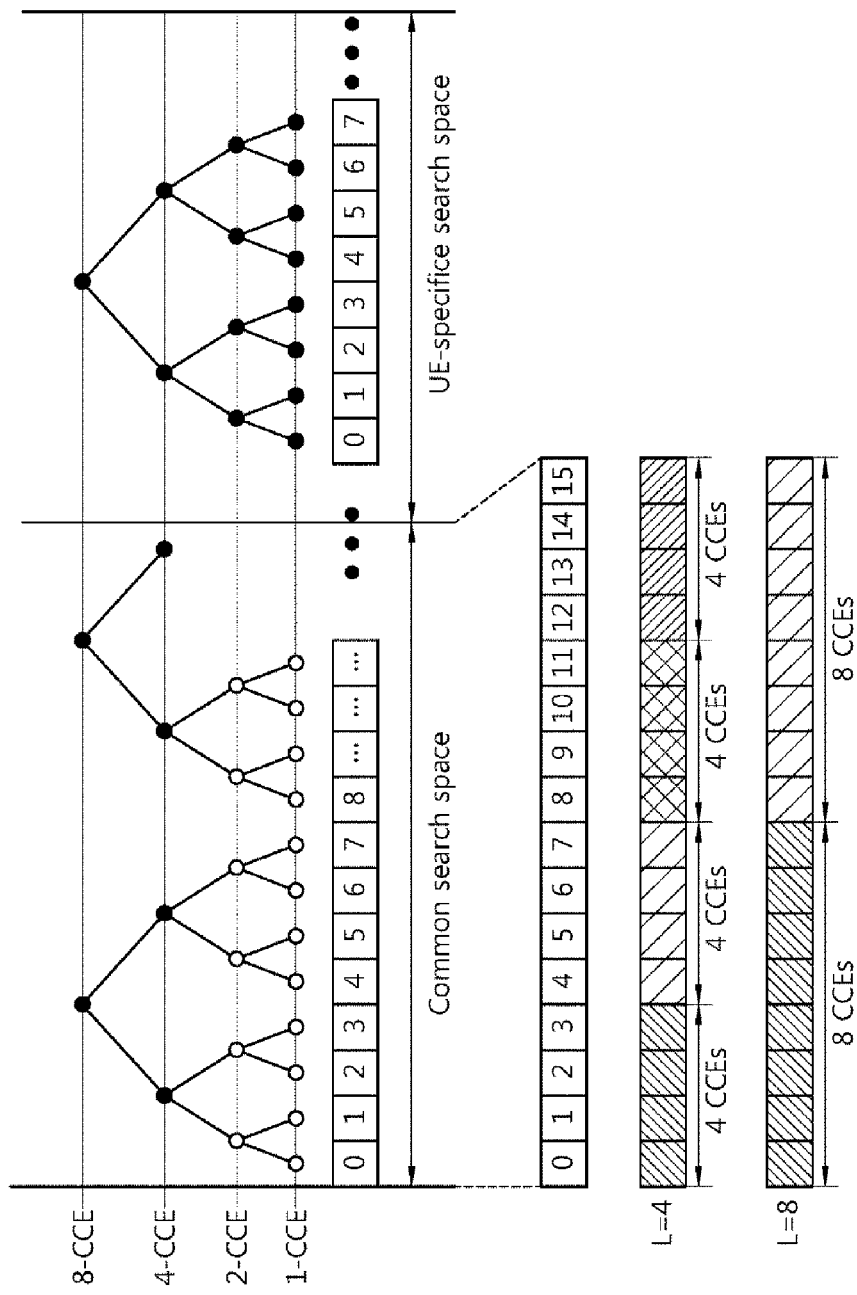
FIG. 2 illustrates an example of monitoring a PDCCH.

FIG. 2 illustrates an example of PDCCH monitoring. For this, 3GPP TS 36.213 V10.2.0 (2011-June), Ch. 9 may be referenced.

In 3GPP LTE, blind decoding is used for detection of a PDCCH. Blind decoding is a scheme in which a desired identified is demasked to the CRC of a received PDCCH (this is referred to as a PDCCH candidate) to check a CRC error, thereby verifying whether the PDCCH is its own control channel or not. The wireless device cannot be aware of what CCE aggregation level or DCI format is used to transmit its PDCCH at what position in the control region.

A plurality of PDCCHs may be transmitted in one sub-frame. The wireless device monitors the plurality of PDCCHs for every sub-frame. Here, monitoring means that the wireless device attempts to decode a PDCCH according to the format of a PDCCH monitored.

In 3GPP LTE, a search space is used to reduce burden that comes from blind decoding. The search space may be a monitoring set of CCEs for a PDCCH. The wireless device monitors the PDCCH in its corresponding search space.

Search spaces may be separated into a common search space and a UE-specific search space. The common search space is one for searching a PDCCH having common channel information and consists of 16 CCEs indexed 0 to 15 and supports a PDCCH having a CCE aggregation level {4, 8}. However, even the common search space may also deliver a PDCCH (DCI format 0, 1A) that carries UE-specific information. The UE-specific search space supports a PDCCH having a CCE aggregation level {1, 2, 4, 8}.

The following table, Table 1, represents the number of PDCCH candidates monitored by a wireless device.

TABLE 1

| Search Space Type | Aggregation level L Size [in CCEs] | Number of PDCCH candidates | | DCI formats |
|---|---|---|---|---|
| UE-specific | 1 | 6 | 6 | 0, 1, 1A, 1B, 1D, 2, 2A |
|  | 2 | 12 | 6 |  |
|  | 4 | 8 | 2 |  |
|  | 8 | 16 | 2 |  |
| Common | 4 | 16 | 4 | 0, 1A, 1C, 3/3A |
|  | 8 | 16 | 2 |  |

The size of a search space is determined by Table 1 above, and the start point of a search space is differently defined in the common search space and UE-specific search space. The start point of the common search space is fixed regardless of sub-frame, but the start point of the UE-specific search space may vary per sub-frame depending on a terminal identifier (for example, C-RNTI), CCE aggregation level, and/or slot number in a radio frame. In case the start point of the UE-specific search space is positioned in the common search space, the UE-specific search space may overlap the common search space.

In the aggregation level L∈{1,2,3,4}, the search space S(L)k is defined as a set of PDCCH candidates. The CCE corresponding to PDCCH candidate m in the search space S(L)k is given as follows:

$$L \cdot \{(Y_k+m') \bmod \lfloor N_{CCE,k}/L \rfloor\}+i \quad \text{[Equation 1]}$$

Here, i=0,1, ..., L−1, m=0, ..., $M^{(L)}$−1, and $N_{CCE,k}$ is the number of all the CCEs that may be used for transmission of a PDCCH in the control region of sub-frame k. The control region includes a set of CCEs numbered 0 to $N_{CCE,k}$−1. $M^{(L)}$ is the number of PDCCH candidates in CCE aggregation level L in the given search space.

If a CIF (carrier indicator field) is configured for the wireless device, m'=m+$M^{(L)}n_{cif}$-$n_{cif}$ is a value of the CIF. Unless the CIF is configured for the wireless device, m'=m.

In the common search space, $Y_k$ is set as 0 for two aggregation levels, L=4 and L=8.

In the UE-specific search space of aggregation level L, variable $Y_k$ is defined as follows.

$$Y_k=(A \cdot Y_{k-1}) \bmod D \quad \text{[Equation 2]}$$

Here, $Y_{-1}=n_{RNTI}\neq 0$, A=39827, D=65537, k=floor($n_s$/2), and $n_s$ is a slot number in the radio frame.

In 3GPP LTE/LTE-A, transmission of a DL transport block is performed in a pair of a PDCCH and a PDSCH. The transmission of a UL transport block is performed in a pair of a PDCCH and a PUSCH. For example, the wireless device receives the DL transport block over the PDSCH indicated by the PDCCH. The wireless device monitors the PDCCH in the DL sub-frame and receives a DL resource allocation over the PDCCH. The wireless device receives a DL transport block over the PDSCH indicated by the DL resource allocation.

Figure 3:
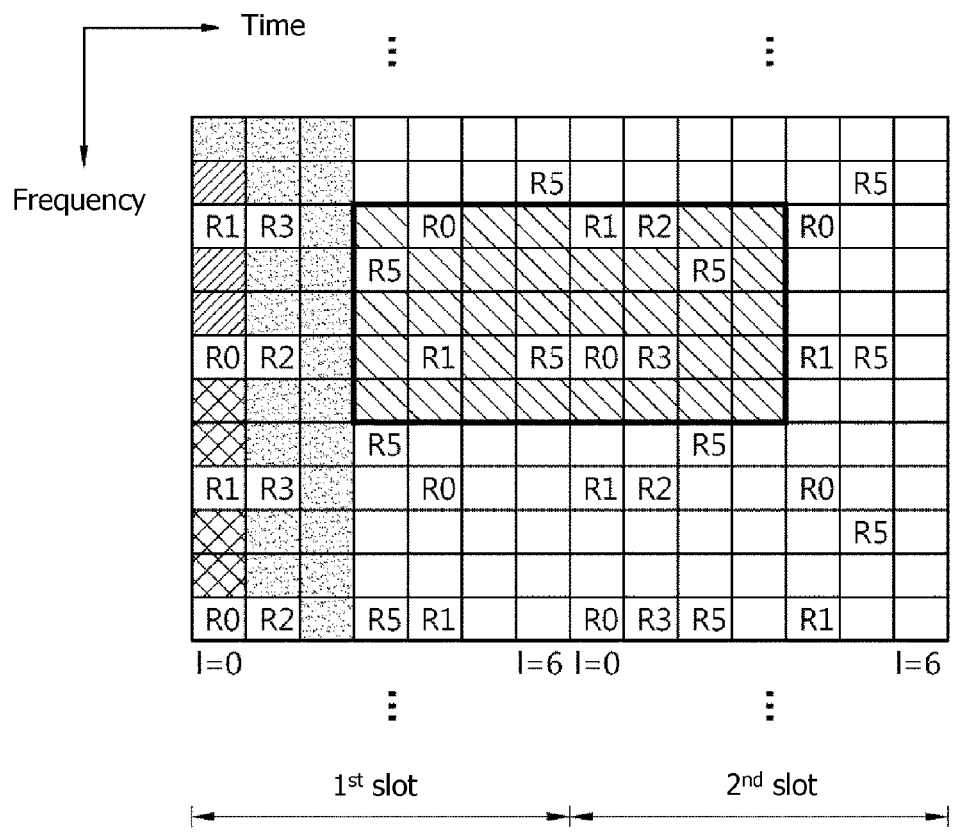
FIG. 3 illustrates an example in which a reference signal and a control channel are arranged in a DL sub-frame.

FIG. 3 illustrates an example arrangement of a reference signal and a control channel in a DL sub-frame.

The control region includes first three OFDM symbols, and the data region where a PDSCH is transmitted includes the remaining OFDM symbols.

In the control region, a PCFICH, PHICH and/or PDCCH are transmitted. The CFI of the PCFICH indicates three OFDM symbols. The area in the control region, except where the PCFICH and/or PHICH are transmitted, is a PDCCH region for monitoring the PDCCH.

In the sub-frame, various reference signals are transmitted as well. The reference signals may include a CRS (cell-specific reference signal reference signal), a URS (UE-specific reference signal), and a CSI (channel state information)-RS.

The CRS may be received by all the wireless devices in the cell and is transmitted over the whole downlink band. In the drawings, 'R0' denotes an RE (resource element) where a CRS for a first antenna port is transmitted, 'R1' an RE where a CRS for a second antenna port is transmitted, 'R2' an RE where a CRS for a third antenna port is transmitted, and 'R3' an RE where a CRS for a fourth antenna port is transmitted.

The RS sequence $r_{l,ns}(m)$ for CRS is defined as follows.

$$r_{l,ns}(m) = \frac{1}{\sqrt{2}}(1-2 \cdot c(2m)) + j\frac{1}{\sqrt{2}}(1-2 \cdot c(2m+1)) \quad \text{[Equation 3]}$$

Here, m=0, 1, ..., $2N_{maxRB}$−1, $N_{maxRB}$ is the maximum number of RBs, ns is a slot number in a radio frame, and l is an OFDM symbol number in a slot.

A pseudo-random sequence, c(i), is defined by a gold sequence whose length is 31, as follows.

$$c(n)=(x_1(n+Nc)+x_2(n+Nc)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2 \quad \text{[Equation 4]}$$

Here, Nc=1600, and the first m-sequence is initialized as $x_1(0)=1$, $x_1(n)=0$, m=1, 2, ..., 30.

The second m-sequence is initialized as $c_{init}=2^{10}(7(ns+1)+l+1)(2N^{cell}_{ID}+1)+2N^{cell}_{ID}+N_{CP}$ at the beginning of each OFDM symbol. $N^{cell}_{ID}$ is a PCI (physical cell identity) of the cell, and $N_{CP}=1$ in the normal CP, and $N_{CP}=0$ in the extension cell.

A URS is transmitted in the sub-frame. Although the CRS is transmitted in the entire sub-frame, the URS is transmitted in the data region of the sub-frame, and is used for demodulation of its corresponding PDSCH. In the drawings, 'R5' denotes an RE where the URS is transmitted. The URS is also referred to as DRS (dedicated reference signal) or DM-RS (demodulation reference signal).

The URS is transmitted only in the RB to which its corresponding PDSCH is mapped. Although in the drawings R5 is marked even in the area except where the PDSCH is transmitted, this is merely to indicate the position of the RE to which the URS is mapped.

The URS is used only by a wireless device that receives its corresponding PDSCH. The RS sequence $r_{ns}(m)$ for the US is the same as Equation 3. At this time, m=0, 1, . . . , $12N_{PDSCH,RB}-1$, and $N_{PDSCH,RB}$ is the number of RBs in the corresponding PDSCH transmission. The pseudo-random sequence generator is initialized as $c_{init}=(\text{floor}(ns/2)+1)(2N^{cell}_{ID}+1)2^{16}+n_{RNTI}$ at the start of each sub-frame. $n_{RNTI}$ is an identifier of a wireless device.

The above-described example is associated with the case where the URS is transmitted through a single antenna. When the URS is transmitted through a multi-antenna, the pseudo-random sequence generator is initialized as $c_{init}=(\text{floor}(ns/2)+1)(2N^{cell}_{ID}+1)2^{16}+n_{SCID}$ at the start of each sub-frame. $n_{SCID}$ is a parameter that is acquired from a DL grant (for example, DCI format 2B or 2C) related with PDSCH transmission.

The URS supports MIMO (Multiple Input Multiple Output) transmission. Depending on an antenna port or layer, the RS sequence for the URS may be spread to the spread sequence as follows.

TABLE 2

| layer | [w(0) w(1) w(2) w(3)] |
|---|---|
| 1 | [+1 +1 +1 +1] |
| 2 | [+1 −1 +1 −1] |
| 3 | [+1 +1 +1 +1] |
| 4 | [+1 −1 +1 −1] |
| 5 | [+1 +1 −1 −1] |
| 6 | [−1 −1 +1 +1] |
| 7 | [+1 −1 −1 +1] |
| 8 | [−1 +1 +1 −1] |

The CSI-RS is used for a specific wireless device to measure a CSI. For the CSI-RS, a CSI configuration is given for each wireless device. The CSI configuration includes the sub-frame where the CSI-RS is transmitted and the position of an RE where the CSI-RS is transmitted in the sub-frame. The CSI configuration may be transmitted from the base station to the terminal as an RRC message.

The CSI-RS has the same reference signal and initial value as the CRS. However, unlike the CRS that may be received by all the wireless device in the cell, the CSI-RS may be used for CSI measurement only by a wireless device that has the CSI-RS configured.

As described above, various control channels and diverse reference signals are transmitted in the DL sub-frame in the 3GPP LTE/LTE-A system.

However, a next-generation system considers an extension CC (component carrier) where none or only some of the existing control channels are transmitted, in order to enhance carrier extendibility and mitigate inter-cell interference. The extension CC is also referred to as a 'new carrier type.' A CC, which is not the extension CC, is referred to as a normal CC.

The extension CC may include an extension DL CC and/or extension UL CC. The extension cell is a serving cell defined by the extension CC. The extension cell may include a single extension DL CC or both an extension DL CC and an extension UL CC. In comparison, the cell defined by the normal CC is referred to as a normal cell.

The primary cell is a normal cell, but a secondary cell that is added/modified/deleted by the primary cell may be a normal cell or extension cell.

Figure 4:
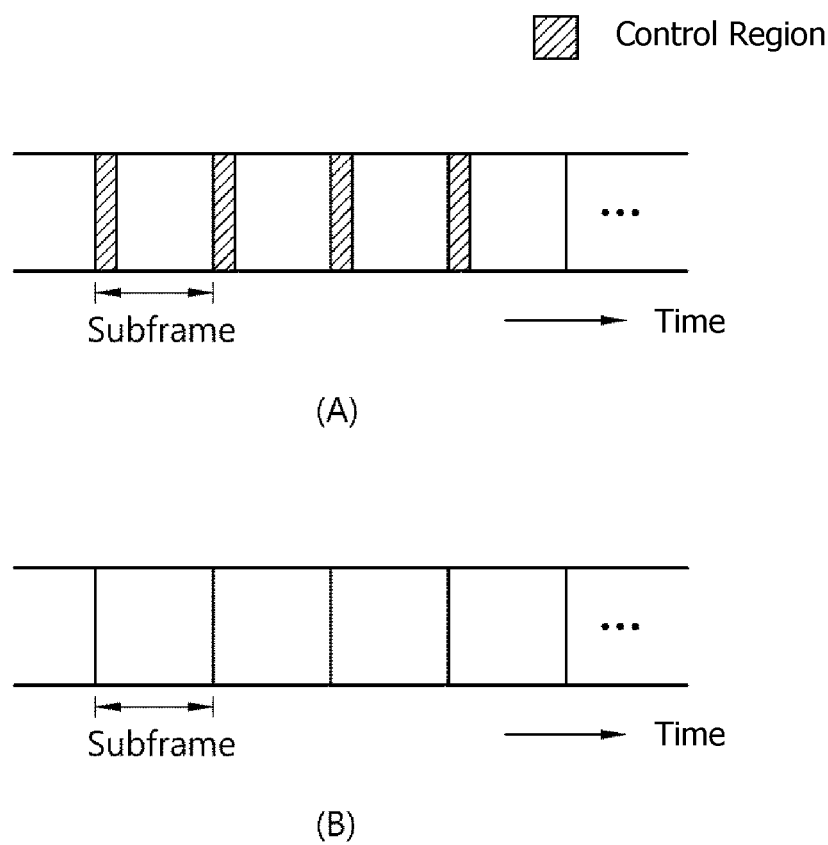
FIG. 4 illustrates an example of comparing a normal DL CC and an extension DL CC.

FIG. 4 illustrates an example comparison between a normal DL CC and an extension DL CC.

FIG. 4(A) illustrates the operation of a normal DL CC. In the normal DL CC, a CSI-RS is defined for every DL sub-frame and a PDCCH is transmitted. The wireless device may monitor a control channel for each sub-frame in the normal DL CC.

FIG. 4(B) illustrates an extension DL CC. In the extension DL CC, no CSI-RS is defined in the DL sub-frame, and no PDCCH is transmitted. The wireless device might not monitor a control channel in the extension DL CC.

Hereinafter, the extension CC is a CC that satisfies at least one of the following.

(1) CC where no control channel (e.g., PDCCH or PUCCH). The wireless device does not monitor a control channel in the extension CC.

(2) CC where no CRS is transmitted or where, as compared with the normal CC, a CRS is restrictively transmitted (for example, when the CRS is transmitted with a broader sub-carrier gap or transmitted only in a specific sub-frame).

(3) CC where no sync signal (at least one of a PSS and an SSS) is transmitted.

The CRS is used for the wireless device to estimate a DL path loss. The DL path loss is used for various purposes, e.g., including determining UL transmission power.

However, in case no CRS is transmitted or a CRS is restrictively transmitted in the extension CC, the wireless device may have a difficulty in estimating a DL path loss in the extension CC.

Figure 5:
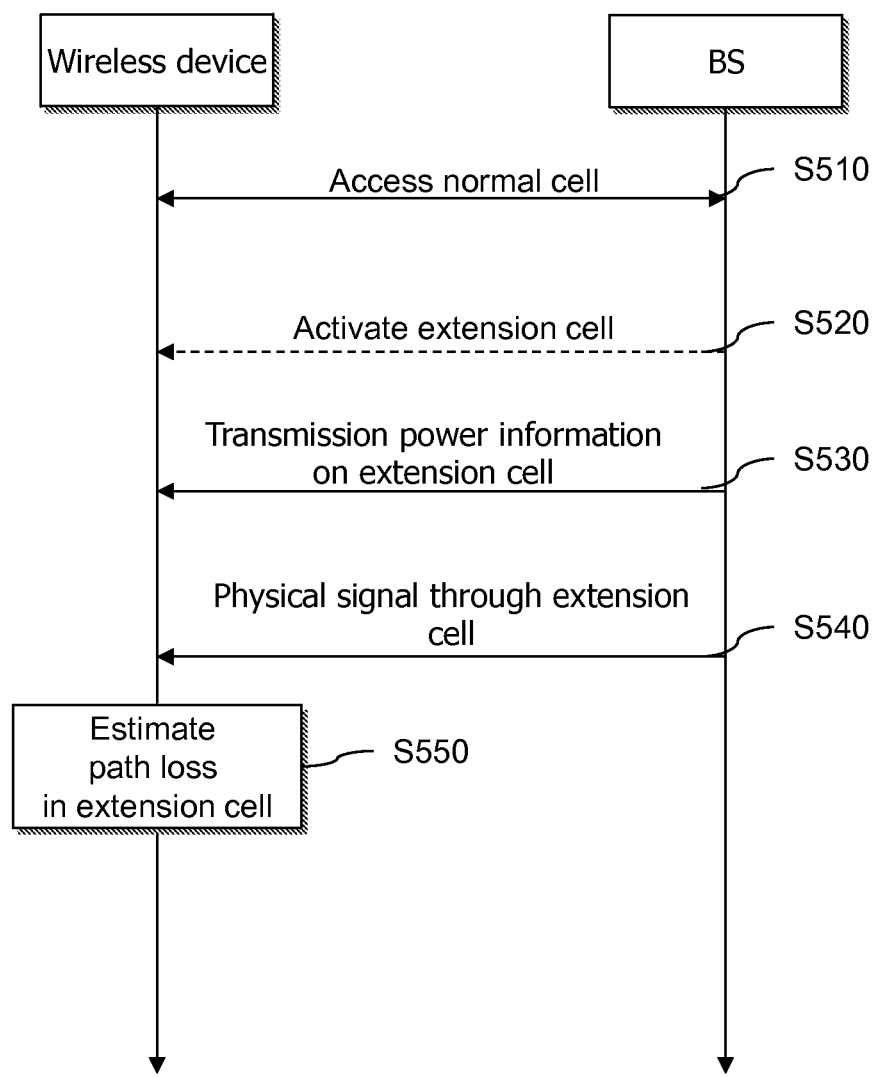
FIG. 5 is a flowchart illustrating an operating method according to an embodiment of the present invention.

FIG. 5 is a flowchart illustrating an operating method according to an embodiment of the present invention.

In step S510, the wireless device accesses a normal cell (e.g., primary cell).

In step S520, the wireless device receives an activation command, indicating activation of an extension cell, from the base station. The activation command may be received through a primary cell.

In another embodiment, an extension cell may be configured without any activation command. When a specific secondary cell is activated, its related extension cell may be activated, or as the wireless device accesses a specific primary cell, an extension cell may be activated.

In step S530, the wireless device receives transmission power information on the physical signal of the extension cell. The physical signal is a signal transmitted in the physical layer of the extension cell. The physical signal may include at least one of a reference signal and a sync signal. The reference signal may include a reference signal (e.g., CSI-RS) used for the wireless device to estimate a channel state. The sync signal may include at least one of a PSS and an SSS. The physical signal may be transmitted in a specific sub-frame or in each sub-frame.

The transmission power information may include information on transmission power of a corresponding physical signal. The transmission power information may be represented in various ways, such as a value of the transmission power of the physical signal or an offset from a value (e.g., transmission power of the CRS of a normal cell) known to the wireless device.

The transmission power information may be received through MAC (Medium Access Control)/RRC (Radio Resource Control) signaling in an extension cell or normal cell (e.g., primary cell).

In step S540, the wireless device receives the physical signal through the extension cell.

In step S550, the wireless device estimates a path loss in the extension cell based on the received physical signal and transmission power information. The wireless device may use the estimated path loss for configuring transmission power of a UL channel.

Additionally, the base station may send out a command as to whether the wireless device is to estimate a DL path loss based on the physical signal of the extension cell. When receiving a command indicating that it is possible to estimate a DL path loss of the extension cell, the wireless device may start to estimate a DL path loss of the extension cell.

The transmission power information is an example, as used when the wireless device estimates a DL path loss of the extension cell. The base station may notify a path loss difference relative to the normal cell to the wireless device. The wireless device may estimate a DL path loss of the extension cell using the relative path loss difference.

The wireless device may measure a DL channel state (for example, RSRP (reference signal reception power) and RSRQ (reference signal reception quality)) based on the physical signal transmitted in the extension cell. The wireless device may report information on the measured DL channel state to the base station.

Meanwhile, the extension cell may be positioned in a frequency band adjacent to other normal cells. Assume that a normal cell positioned in the adjacent frequency band is an associated cell. A CC corresponding to the associated cell is referred to as an associated CC.

Figure 6:
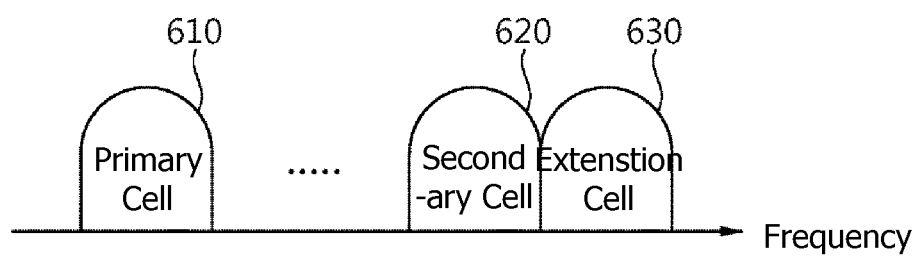
FIG. 6 illustrates an example associated cell.

FIG. 6 illustrates an example associated cell.

The wireless device receives services from a primary cell 610 and a secondary cell 620. An extension cell 630 is positioned closer to the secondary cell 620 than to the primary cell 610. The secondary cell 620 is an associated cell.

Information on the associated cell (or associated CC) may be informed by the base station to the wireless device or may be previously designated.

Since the extension cell and the associated cell are positioned in similar frequency areas, DL/UL path loss characteristics are similar. Accordingly, the base station having the wireless device obtain the path loss of the extension cell based on the path loss of the associated cell is suggested.

The associated cell may be used to estimate a channel state of an extension cell, as well as a path loss of the extension cell.

When a specific condition is met, path loss estimation or channel state estimation of the extension cell may be conducted using the associated cell.

The specific condition may be that the base station transmits to the wireless device an indicator as to whether to use the physical signal of the extension for estimating a path loss of the extension cell or to use the physical signal of the associated cell for estimating a path loss of the extension cell. The indicator may be transmitted through MAC/RRC signaling.

Or, the specific condition may be that no sync signal is transmitted through the extension cell. The sync signal being not transmitted through the extension cell means that there is an associated cell in an adjacent frequency band and time/frequency sync may be achieved through the associated cell, and thus, path loss estimation or channel state estimation may be assumed to be conducted through the associated cell.

The associated cell that may conduct path loss estimation or channel state estimation of the extension cell may include the same cell as the cell that is designated to establish time/frequency sync for the extension cell.

A method is suggested which estimates a path loss for an extension cell where no CRS is transmitted or a CRS is restrictively transmitted. Inter-cell interference that arises due to UL transmission may be reduced by efficiently controlling UL transmission power in the extension cell.

In the above-described embodiment, the base station provides transmission power information on the reference signal and/or sync signal transmitted in the extension cell to the wireless device, but this is merely an example. The base station may provide the wireless device with transmission power information on the reference signal and/or sync signal that is transmitted in a specific serving cell, specific neighbor cell, or specific CC, not the extension cell.

The wireless device may operate multiple cells and feed back CSI (channel state information) on a plurality of serving cells in the same sub-frame. At this time, in case the CSI information on some cells should be abandoned due to a payload limit to the PUCCH/PUSCH, the CSI information on the extension cell may be first dropped. This relies on the fact that the extension cell is an additional cell and that the extension cell is supposed to be under a disadvantageous environment, e.g., relatively highly interfered, and thus its scheduling priority may be considered relatively low from the point of view of the network. Further, this is why abandoning or delaying the transmission of CSI information on the extension cell may have less influence on the system than abandoning the transmission of CSI information on other normal cells. The extension cell may have highest priority in abandoning the transmission of CSI information. Or, depending on other references (for example, items included in the CSI), serving cells whose CSI information transmission is to be abandoned may be selected, and then, among the selected serving cells, the extension cell may be given the highest priority.

The wireless device may operate multiple cells and transmit HARQ ACK/NACK information on a plurality of serving cells. The protection level of the ACK/NACK information of the extension cell may be set to be lower than the protection level of the ACK/NACK information of the normal cell. Setting the protection level to be low means placing a bit where an error is highly likely to occur or increasing a code rate (for example, ¼ for normal cells and ½ for extension cell). For example, assume that an RM (Reed-Muler) code is used for ACK/NACK encoding. The ACK/NACK information of the extension cell may be mapped to a codeword having a higher order than the normal cell. Or, when per-cell ACK/NACK information is individually encoded, the transmission power of the ACK/NACK information of the extension cell may be rendered to be lower than the transmission power of the ACK/NACK information of the normal cell. This may be particularly useful when a maximum power limit is posed to the physical channel used for transmission of ACK/NACK information.

An extension UL CC is now described.

When an extension cell is defined, the extension cell may be defined only with an extension DL CC or with both an extension UL CC and an extension DL CC. The extension UL CC may be a CC that is to be paired with the extension DL CC. The linkage between the extension DL CC and the extension UL CC may be notified to the wireless device by the base station.

The extension UL CC may be defined to reduce interference with neighbor cells or to enhance extendibility.

In the extension UL CC, a UL control channel such as PUCCH may be prohibited from being transmitted, or transmission of the UL control channel may be restricted as compared with the normal UL CC.

In the extended UL CC, the UCI (uplink control information) may be banned from being piggybacked to the PUSCH. Or, UCI piggy back may be first applied to the normal UL CC, as compared with the extension UL CC.

In case UL physical channels for a plurality of serving cells are simultaneously transmitted in the same UL sub-frame, the transmission power of the UL physical channels transmitted through the extended UL CC may be first reduced, as compared with the normal UL CC, or transmission of the UL physical channels may be abandoned. The UL physical channels may include at least any one of a PUSCH, a PUCCH, and an SRS (sounding reference signal).

In a method for lowering the UCI piggyback priority, CSI feedback priority, or ACK/NACK information priority, the cell index of the extension cell may be placed in a specific range. For example, the cell index of the extension cell may be set to be larger than the cell index of the normal cell. Since the cell index of the extension cell is larger than the cell index of the normal cell, the priority may be set in descending order of the cell indexes.

Figure 7:
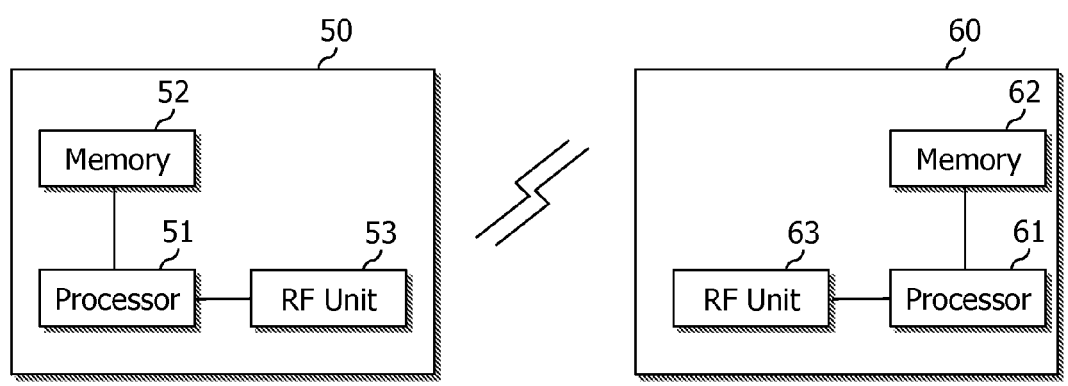
FIG. 7 is a block diagram illustrating a wireless communication system in which an embodiment of the present invention is implemented.

FIG. 7 is a block diagram illustrating a wireless communication system in which an embodiment of the present invention is implemented.

The base station 50 includes a processor 51, a memory 52, and an RF (Radio Frequency) unit 53. The memory 52 is connected with the processor 51 and stores various pieces of information for driving the processor 51. The RF unit 53 is connected with the processor 51 and transmits and/or receives radio signals. The processor 51 implements a function, process, and/or method as suggested herein. In the above-described embodiments, the operation of the base station may be implemented by the processor 51.

The wireless device 60 includes a processor 61, a memory 62, and an RF unit 63. The memory 62 is connected with the processor 61 and stores various pieces of information for driving the processor 61. The RF unit 63 is connected with the processor 61 and transmits and/or receives radio signals. The processor 61 implements a function, process, and/or method as suggested herein. In the above-described embodiments, the operation of the wireless device may be implemented by the processor 61.

The processor may include an ASIC (application-specific integrated circuit), other chipsets, a logic circuit, and/or a data processing device. The memory may include an ROM (read-only memory), an RAM (random access memory), a flash memory, a memory card, a storage medium, and/or other storage devices. The RF unit may include a baseband circuit for processing radio signals. When an embodiment is implemented in software, the above-described schemes may be realized in modules (processes, or functions) for performing the above-described functions. The modules may be stored in the memory and executed by the processor. The memory may be positioned in or outside the processor and may be connected with the processor via various well-known means.

In the above-described systems, the methods are described with the flowcharts having a series of steps or blocks, but the present invention is not limited to the steps or order. Some steps may be performed simultaneously or in a different order from other steps. It will be understood by one of ordinary skill that the steps in the flowcharts do not exclude each other, and other steps may be included in the flowcharts or some of the steps in the flowcharts may be deleted without affecting the scope of the invention.

The invention claimed is:

1. A method of operating a wireless device in a multi-cell, the method comprising:
receiving, from a first cell instead of a second cell configured with no transmission of a physical downlink control channel (PDCCH), a physical uplink control channel (PUCCH) and a cell-specific reference signal (CRS), control information on a transmission power of a physical downlink signal to be transmitted from the second cell,
wherein the control information includes a relative offset between a transmit power of a CRS of the first cell and a transmit power of the physical downlink signal to be transmitted from the second cell, and
wherein the relative offset included in the received control information is used for the wireless device, which is unable to receive the CRS from the second cell and measure a transmit power of the CRS from the second cell, to estimate a downlink path loss of the physical downlink signal to be received from the second cell;
receiving, from the second cell, the physical downlink signal, based on the control information received from the first cell;
estimating the downlink path loss of the physical downlink signal received from the second cell, based on the relative offset, without receiving the CRS from the second cell and measuring the transmit power of the CRS from the second cell; and
piggy-backing and transmitting the estimated downlink path loss onto a physical uplink shared channel (PUSCH) of the first cell if it is not allowed to transmit the PUSCH to the second cell configured with no transmission of the PUCCH.

2. The method of claim 1, wherein the physical signal includes at least one of a reference signal and a sync signal.

3. The method of claim 1, further comprising:
receiving information on an associated cell operating in a frequency band adjacent to a frequency band of the second cell.

4. The method of claim 1, further comprising:
receiving, from the first cell, an activation message with respect to the second cell; and
activating the second cell based on the activation message.

5. The method of claim 1, further comprising:
receiving a command as to whether to estimate the downlink path loss.

6. A wireless device operating in a multi-cell, the wireless device comprising:
a radio frequency RF unit configured to transmit and receive a radio signal; and
a processor connected with the RF unit, the processor configured to:
receive, from a first cell instead of a second cell configured with no transmission of a control channel and a cell-specific reference signal (CRS), control information on a transmission power of a physical downlink signal to be transmitted from the second cell,
wherein the control information includes a relative offset between a transmit power of a CRS of the first cell and a transmit power of the physical downlink signal to be transmitted from the second cell, and
wherein the relative offset included in the received control information is used for the wireless device, which is unable to receive the CRS from the second cell and measure a transmit power of the CRS from the second cell, to estimate a downlink path loss of the physical downlink signal to be received from the second cell,
receive, from the second cell, the physical downlink signal, based on the control information received from the first cell, and
estimate the downlink path loss of the physical downlink signal received from the second cell, based on the relative offset, without receiving the CRS from the second cell and measuring the transmit power of the CRS from the second cell, and piggy-back and transmit the estimated downlink path loss onto a physical uplink shared channel (PUSCH) of the first cell if it is not allowed to transmit the PUSCH to the second cell configured with no transmission of the PUCCH.

7. The wireless device of claim 6, wherein the physical signal includes at least one of a reference signal and a sync signal.

8. The wireless device of claim 6, wherein the processor is further configured to:

receive information on an associated cell operating in a frequency band adjacent to a frequency band of the second cell.

9. The wireless device of claim 6, wherein the processor is further configured to:

receive, from the first cell, an activation message with respect to the second cell, and activate the second cell based on the activation message.

* * * * *